United States Patent
Rajasimman et al.

(10) Patent No.: US 7,826,836 B2
(45) Date of Patent: Nov. 2, 2010

(54) CELL BASE STATION VIRTUAL RF CAGE

(75) Inventors: Vijayasimman Rajasimman, Richardson, TX (US); Nivedan Thadasina, Allen, TX (US); John C. Jubin, Richardson, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 544 days.

(21) Appl. No.: 11/848,718

(22) Filed: Aug. 31, 2007

(65) Prior Publication Data

US 2009/0061937 A1   Mar. 5, 2009

(51) Int. Cl.
*H04W 4/00*  (2009.01)
*H04B 7/00*  (2006.01)

(52) U.S. Cl. .................. 455/422.1; 455/435.1; 455/522

(58) Field of Classification Search ............... 455/422.1, 455/435.1, 435.2, 450, 515, 524, 525, 560, 455/561, 522
See application file for complete search history.

(56) References Cited

U.S. PATENT DOCUMENTS

| | | | |
|---|---|---|---|
| 5,577,168 A | 11/1996 | Haas et al. | |
| 5,864,549 A * | 1/1999 | Honkasalo et al. | 370/335 |
| 6,091,955 A | 7/2000 | Aalto et al. | |
| 6,205,132 B1 | 3/2001 | Hong et al. | |
| 6,321,090 B1 | 11/2001 | Soliman | |
| 6,424,834 B1 | 7/2002 | Chang et al. | |
| 6,430,168 B1 | 8/2002 | Djurkovic et al. | |
| 6,621,811 B1 | 9/2003 | Chang et al. | |
| 6,826,402 B1 | 11/2004 | Tran | |
| 6,928,283 B2 | 8/2005 | Rudolf | |
| 7,127,250 B2 * | 10/2006 | Gallagher et al. | 455/436 |
| 2002/0086675 A1 | 7/2002 | Mansour | |
| 2005/0130586 A1 * | 6/2005 | Gnuschke et al. | 455/3.06 |

OTHER PUBLICATIONS

Weal, Paul et al; "Optimisation of CDMA-Based Mobile Telephone Networks: Algorithmic Studies on Real-World Networks"; University of Exeter, UK; 2006, 10 pgs.

* cited by examiner

*Primary Examiner*—Sonny Trinh (57) ABSTRACT

A base station for use within a structure is provided. The base station includes an apparatus to automatically set an operating carrier power level to be effective within the structure and in a limited area surrounding the structure to promote reducing interference with mobile units outside the limited area. The base station also includes an apparatus to automatically set beacon channel power to provide service substantially within the structure.

20 Claims, 7 Drawing Sheets

CELL BASE STATION VIRTUAL RF CAGE

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

The present disclosure relates to code division multiple access CDMA cellular networks and more particularly to a home base station which automatically operates a beacon carrier at minimal power to prevent foreign mobile units from attempting to connect with the home base station.

Inadequate coverage is a persistent problem in the quality of service of any wireless network. Natural and man-made obstacles frequently create radio frequency (RF) holes, i.e. areas of low or no RF signal, in the coverage area of a wireless network. Voice and data call connections are frequently dropped when a wireless terminal, such as a cell phone or a similar mobile station, enters an RF hole. Typical areas in which RF holes occur include homes, apartments, underground tunnels and office buildings.

Conventional public CDMA cellular systems include a number of macro base stations, MBSs, arranged to provide service in contiguous cells. As mobile units, MUs, move between cells, the mobile units are handed off between macro base stations to maintain continuous service. Each MBS transmits a beacon channel in addition to traffic channels that handle actual telephone traffic. Each MU monitors the beacon channel of other nearby cells and continuously compares the strength of the nearby beacon channels to the MBS which is currently serving the MU. When a beacon signal from another MBS has more power, typically 3 db more power, the MU switches to the new MBS. Thus the beacon channel or channels of each MBS effectively attract MUs that have moved into the cell served by the MBS.

SUMMARY

In one embodiment, a base station for use within a structure is provided. The base station includes an apparatus to automatically set an operating channel, also known as carrier, power level to provide service within the structure and in a limited area surrounding the structure to promote reducing interference with mobile units outside the limited area. The base station also includes an apparatus to automatically set beacon channel power to attract MUs only when they are substantially within the structure.

In one embodiment, a code division multiple access telecommunications network is provided. The network includes a plurality of macro base stations connected to a first network and controlled by one or more macro base station controllers. A home base station is located within a structure in a cell served by at least one of the macro base stations. The home base station not being connected to the first network and not associated with any of the one or more macro base stations. The home base station is configured to automatically set an operating channel, or carrier, power level to provide service within the structure and in a limited area surrounding the structure to reduce interfering with mobile units outside the limited area, and to automatically set beacon channel power to attract MUs only when they are substantially within the structure.

In another embodiment, a method for a home base station in a code division multiple access telecommunications network is provided. The method includes installing a home base station within a structure located within a cell served by a macro base station. The method includes configuring the home base station to automatically set an operating carrier power level to provide service within the structure and in a limited area surrounding the structure to reduce interference with mobile units outside the limited area, and to automatically set beacon channel power to attract MUs only when they are substantially within the structure.

In an embodiment, the home base station includes a mobile unit receiver. The receiver is operated to receive and measure the strength of beacon pilot signals from nearby macro base stations. The measured values are used to set operating channel and beacon channel power.

In one embodiment, the beacon power is set at a fixed or static value less than the operating channel power level.

In one embodiment, the home base station receives registration messages from mobile units and uses beacon power levels contained in those messages to select the beacon power level of the home base station.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or in existence. The disclosure should in no way be limited to the illustrative implementations, drawings, and techniques illustrated below, but may be modified within the scope of the appended claims along with their full scope of equivalents.

A "home base station" (HBS) can be used for various reasons including to fill an RF hole in a home, apartment, office, or other structure for mobile devices, mobile phones, computers, or other wireless devices or mobile stations, referred to herein as home mobile units, HMUs, normally operated within the structure. An HBS is generally speaking a very small cell base station designed to support a small number, e.g. two to four, of HMUs in or near a structure such as a private residence, business office or the like. The number of HBSs is therefore expected to be much larger than the number of MBSs. An HBS generally may not provide service to foreign mobile stations, which are served by macro-network base stations, and may be programmed, for example, to allow only registered MUs to be served by the HBS. The term "home" is used herein because the HBS was initially conceived for use in private residences, but is not intended to limit use to either residences or to privately owned structures. For example, an HBS may be used to provide mobile service to individuals working in a private building or a government building or facility.

An HBS must provide all the normal mobile telephone services to a MU just like a MBS. For example, each HBS needs to have one or more beacon channels, just like a MBS, to enable handoff of mobile units from a MBS to the HBS when the mobile units move into range of the HBS, e.g. move inside a private residence or other structure served by the HBS.

However, several problems were discovered when conventional beacon channel practices were considered for use in an HBS. In conventional public systems, the beacon channels operate at or close to the same power level as the traffic channel of the relevant MBS. Each MU monitors the power level of the pilot portion of the beacon signal as a measure of the power of the traffic channel for the relevant MBS. That is, the MU makes its decisions to switch between MBSs based on the measured beacon pilot signals.

It is desirable for the traffic channel of a HBS to have the maximum power possible without interfering with foreign mobile units, FMUs, i.e. MUs that are not intended to be served by the HBS. For example, high traffic channel power allows home mobile units, HMUs, to be served in lawn areas and other outdoor areas surrounding a home or building being served by a HBS. If the beacon channel of a HBS is also operated at the same high power level, it may be detected by FMUs outside the premises, e.g. on a public street or neighboring premises, and the FMUs may automatically attempt to switch to the HBS. A preferred HBS is programmed to serve only HMUs which have been registered with the HBS and an FMU which attempts to switch to the HBS may be refused service resulting in a loss of service to the FMU.

Disclosed herein are HBSs which operate beacon channels at reduced power levels relative to the traffic, or operating, channel power selected by or for the HBS. The beacon channel power level is preferably selected to attract only MUs which have entered a premises served by the HBS and more preferably only MUs which have entered a structure, e.g. residence or office, served by the HBS. The actual beacon power level to achieve the desired limited range depends on many physical factors such as the size of the structure, location of the HBS in the structure, the materials used to build the structure, the strength of signals from nearby MBSs, etc. It would be expensive to have technicians make appropriate measurements and manually set a desirable beacon channel power level. If the physical factors change, the beacon power level may need to be changed. For HBSs to be a commercial success, the cost of equipment and labor should be kept to a minimum. HBSs disclosed herein include systems for automatically determining an appropriate beacon channel power level upon initial installation and for automatically adjusting to changing conditions. The disclosed HBSs provide a virtual RF cage for the HBS, i.e. they promote preventing FMUs from attempting to handoff to the HBSs without requiring physical structures such as shielding or directional antennas.

Figure 1:
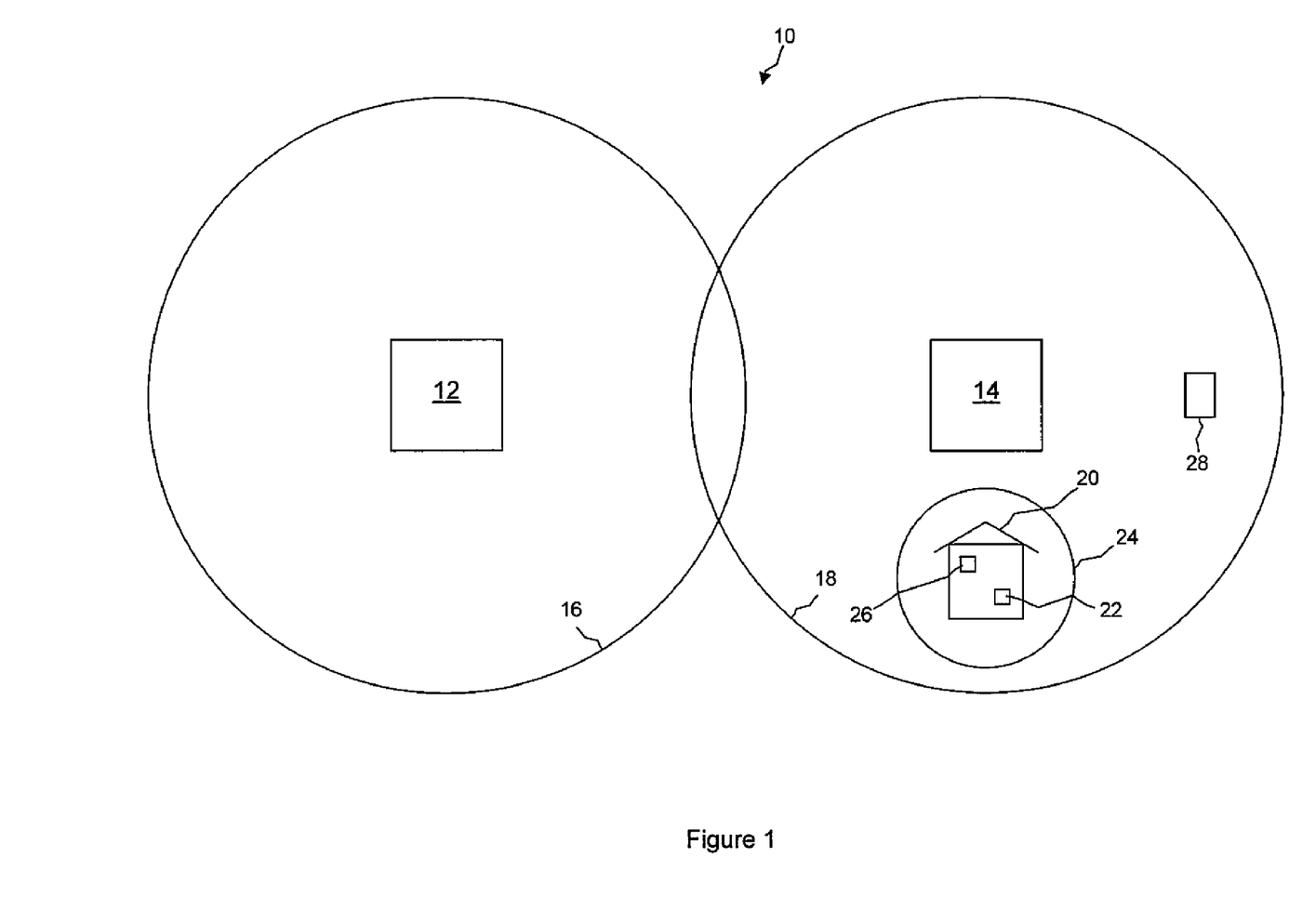
FIG. 1 is a general diagram of a CDMA cellular system overlaying a home base station.

FIG. 1 illustrates a CDMA cellular system 10 configured according to an embodiment. The system 10 includes a large number of macro base stations, MBSs, of which two MBSs 12 and 14 are shown in FIG. 1. MBS 12 serves a cell indicated by the circle 16 and MBS 14 serves a contiguous cell indicated by the circle 18. It is understood that cells 16, 18 may have other shapes and may be divided into sectors depending on antenna configurations and other factors. A private residence 20 is located within the cell 18. Within the residence 20 is located a home base station, HBS, 22. The HBS 22 serves a small cell including the area enclosed by the residence 20 and possibly a small area surrounding the residence 20 as indicated by the circle 24, again with the understanding that the cell 24 may have other shapes, and may not completely enclose or provide service to the entire building depending upon the size and configuration of the structure.

The circle 24 indicates the area in which the HBS 22 provides sufficient traffic, or operating, channel power to provide acceptable voice service to a MU. In one embodiment, the circle 24 has a radius of about thirty meters, but in others may be as much as one hundred meters, depending upon how much traffic channel power may be transmitted without interfering with MUs being served by MBS 14 or 12 or other MBSs. In a typical embodiment, the HBS 22 may transmit at traffic channel power of 17 dBm. In all embodiments, the HBS beacon channel transmits at a significantly lower power level than the traffic channel. In an embodiment, the beacon channel transmits at a power of minus ten dBm, i.e. twenty-seven dB below the traffic channel. In an embodiment, the beacon power level is selected to have an effective range of about ten meters, when the traffic channel has an effective range of about thirty meters. The effective range of the beacon channel may be located entirely within the residence 20. For purposes of this disclosure, the effective range of the HBS beacon signal is the range at which the power detected by a MU would be sufficiently greater, e.g. three dB greater, than the power from an MBS currently serving the MU to cause the MU to attempt to handoff its service to the HBS.

A home mobile unit, HMU, 26 is shown within the residence 20 and therefore within the cell 24 and is served by the HBS 22. A foreign mobile unit, FMU 28 is shown within the cell area 18, but outside the residence 20, and is served by the MBS 14. In this configuration, the cell 24 is considered an underlay cell relative to the cell 18 and the cell 18 is considered an overlay cell relative to the cell 24. The cell 16 and other cells may also be considered to be overlay cells relative to cell 24, depending on distance and signal strength as discussed below.

Mobile units 26 and 28 may be any suitable wireless devices (e.g., conventional cell phones, PCS handsets, personal digital assistant (PDA) handsets, portable computers, telemetry devices, etc.) that are capable of communicating with base stations 12, 14, 22 via wireless links. It should be understood that the use of the term "mobile unit" in the claims and in the description below is intended to encompass both truly mobile devices (e.g., cell phones, wireless laptops) and stationary wireless terminals (e.g., a machine monitor with wireless capability). In the disclosed embodiments, the HMU 26 and FMU 28 may be substantially similar devices. That is, no modifications to a MU are needed for the MU to operate as an HMU. The HBS may distinguish between an HMU and a FMU based on the identification numbers of the MUs. In one embodiment, the HBS 22 is programmed to provide service only to MUs which have been registered with the HBS 22.

Figure 2:
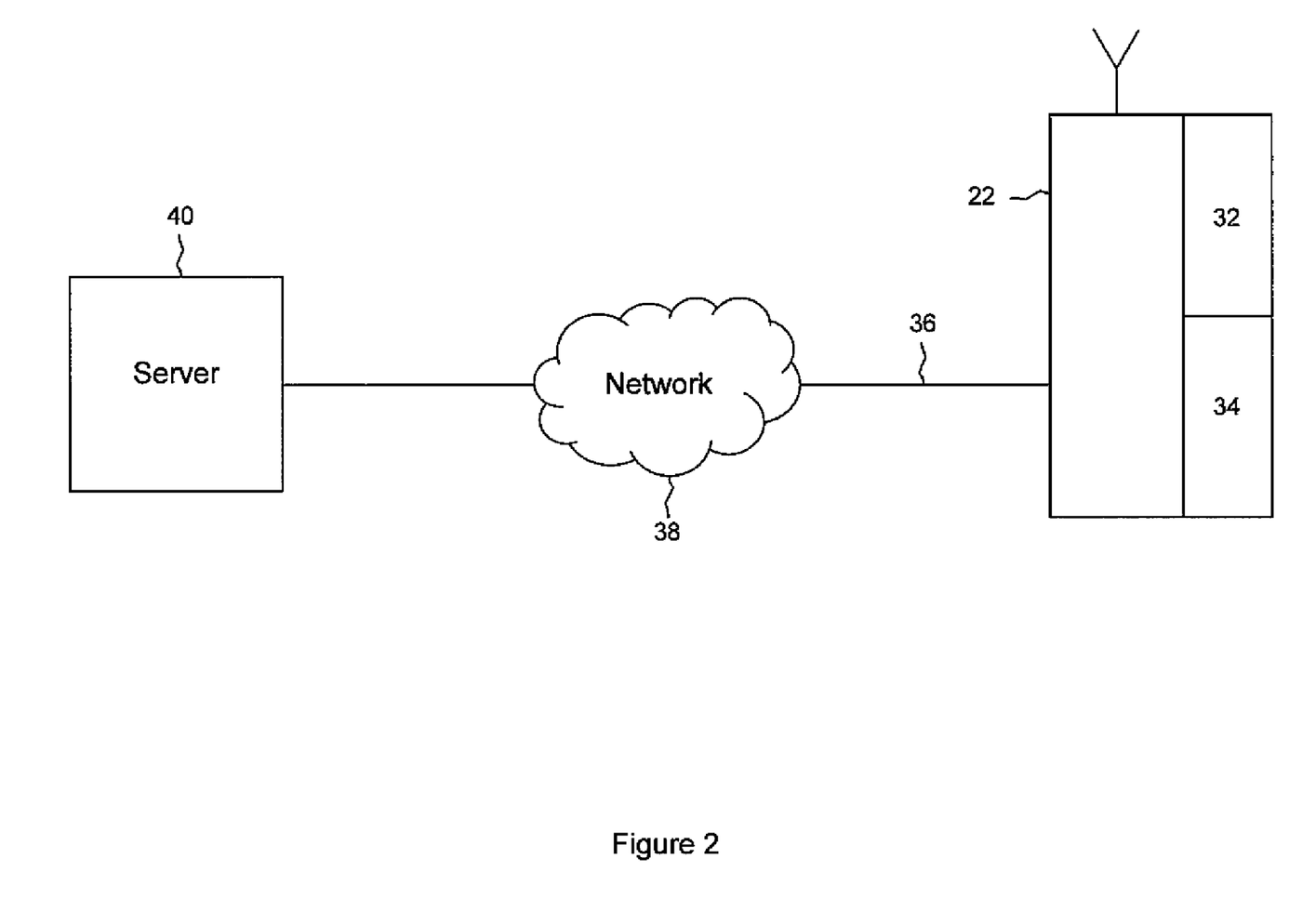
FIG. 2 is a block diagram of a home base station and its network.

FIG. 2 illustrates more details of an embodiment of a HBS 22. The HBS 22 includes functional elements of a conventional CDMA base station, such as those used in MBSs 12 and 14, as needed to support service for MUs. The HBS 22 includes an antenna 30 for communicating with MUs. HBS 22 includes a Global Positioning System, GPS, receiver 32 for receiving position and timing information. In addition, HBS 22 includes a mobile module, or over the air receiver, 34 which provides partial functionality of a mobile unit, such as MUs 26 and 28.

The HBS 22 has a connection 36 to a network 38, e.g. the Internet. The connection 36 may be through an ISP (Internet Service Provider) used by the occupants of the residence 20. The connection 36 may be any conventional IP (Internet Protocol) or other connection, but preferably is a high speed connection such as cable, DSL (digital subscriber line) or an optical fiber system. The HBS 22 connects through the connection 36 to a server 40 operated by the cellular telephone service provider.

The HBS 22 is not connected to the same network as the MBSs 12 and 14, and is not controlled by the same base station controller as the MBSs 12 and 14. The HBS 22 includes it own base station controller functionality. In conventional cell systems which include MBSs overlaying smaller underlay cells, both the overlay and underlay base stations are controlled by the same base station controller. Such systems can use a single beacon frequency to controlling handoff, because the single base station controller can instruct all MUs being served to monitor a single beacon frequency, even if they are being served by a traffic channel at another frequency.

Since HBS 22 is not controlled by the same base station controller as the MBSs 12 and 14, its beacon signal is a hopping signal. The hopping signal transmits at a plurality of frequencies and continuously cycles through the frequencies. The signal needs to be transmitted at all frequencies of nearby MBSs which may be serving HMUs that may enter the residence 20 and desirably be switched to the HBS 22. Thus in the FIG. 1 scenario, the HBS 22 beacon should provide a frequency corresponding to MBS 14, since it can be expected that the HMU 26 may be served by MBS 14 when it moves from outside to inside cell 24. However, it is very possible that HMU 26 passed through cell 16 and is still receiving service from MBS 12 when it enters cell 24. It is also likely that cell 18 may have multiple traffic channel frequencies and HMU may be operating at any one of them when it enters the residence 20. In any case, the HBS 22 beacon preferably transmits its signal at all frequencies at which an HMU may be operating when it enters the cell 24. It would be possible to provide multiple beacon transmitters to transmit the multiple frequencies, but this would increase the cost of a HBS. A hopping beacon is preferred to minimize the cost of the HBS 22.

Figure 3:
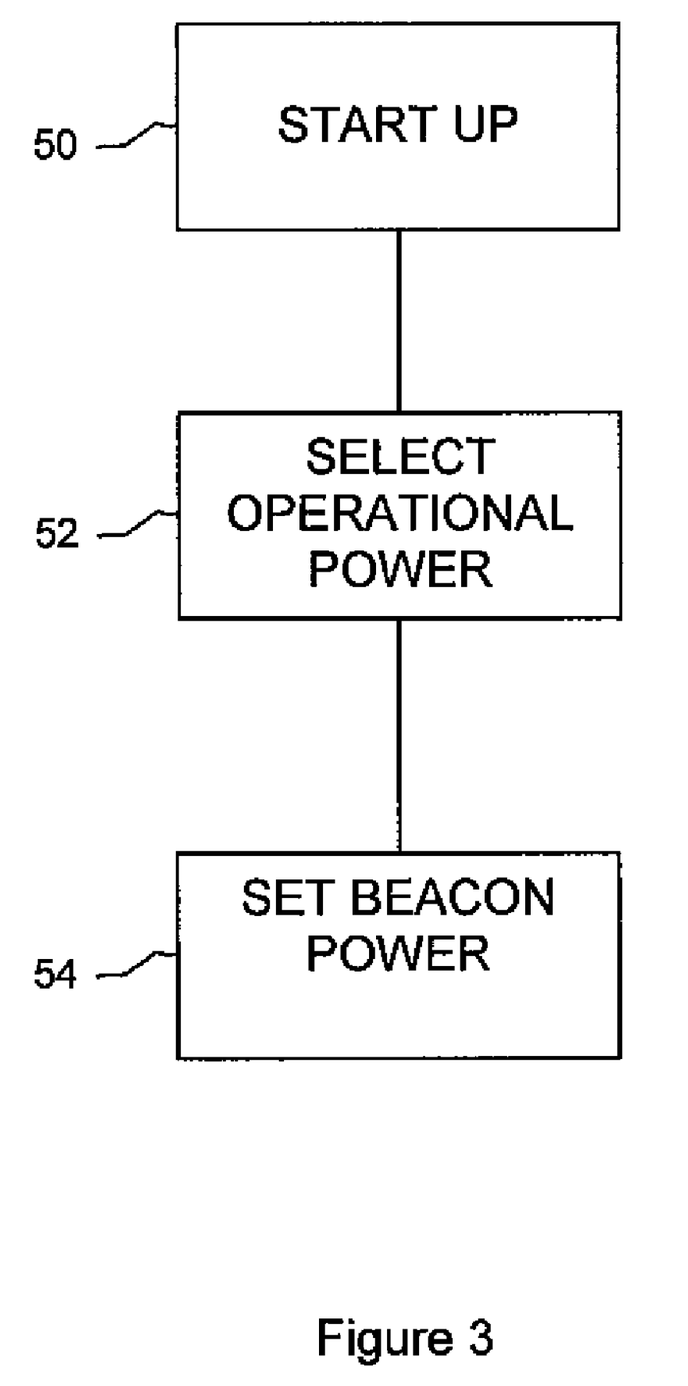
FIG. 3 is a flow diagram of a first method for setting beacon power.

Operation of a first embodiment will be described with reference to the flow chart of FIG. 3. At step 50, the HBS 22 is started, e.g. the system is installed and power is turned on. The startup step may be repeated whenever power is restored to HBS after a power outage or upon another restart event, e.g. manual activation of a reset or restart button or receipt of a restart command from a remote server. The HBS 22 may be programmed to automatically restart or recheck or audit on a daily basis or more often and each such event is considered a startup for purposes of step 50.

At step 52, the HBS 22 selects a desirable operational power. The operational power is selected to be high enough to provide good power to the HMUs located within the cell 24 without causing unacceptable interference with FMUs. Various methods for selecting the operational power are disclosed in U.S. patent application Ser. No. 11/431,395 filed May 10, 2006 by the present inventors and titled "Auto Adaptive Technique to Provide Adequate Coverage and Mitigate RF Interference", which is hereby incorporated by reference for all purposes.

At step 54, the HBS sets its beacon power at a fixed level below the operational power. As discussed above, if the operational power is 17 dBm, the beacon power may be set at minus 10 dBm. In that case, the beacon power would be set at 27 dB below the power of the operational channel power. Each time the HBS 22 resets the operational power in step 52, the beacon power is reset at a static or fixed offset below the operational power. For example, if operational power is reduced to 15 dBm, the beacon may be reset to minus 12 dBm to maintain a 27 dB difference. Static offsets more or less than 27 dB may be selected, but in any case the offset is large enough to provide a substantial difference between the operational power and the beacon power, e.g. at least 6 dB.

Figure 4:
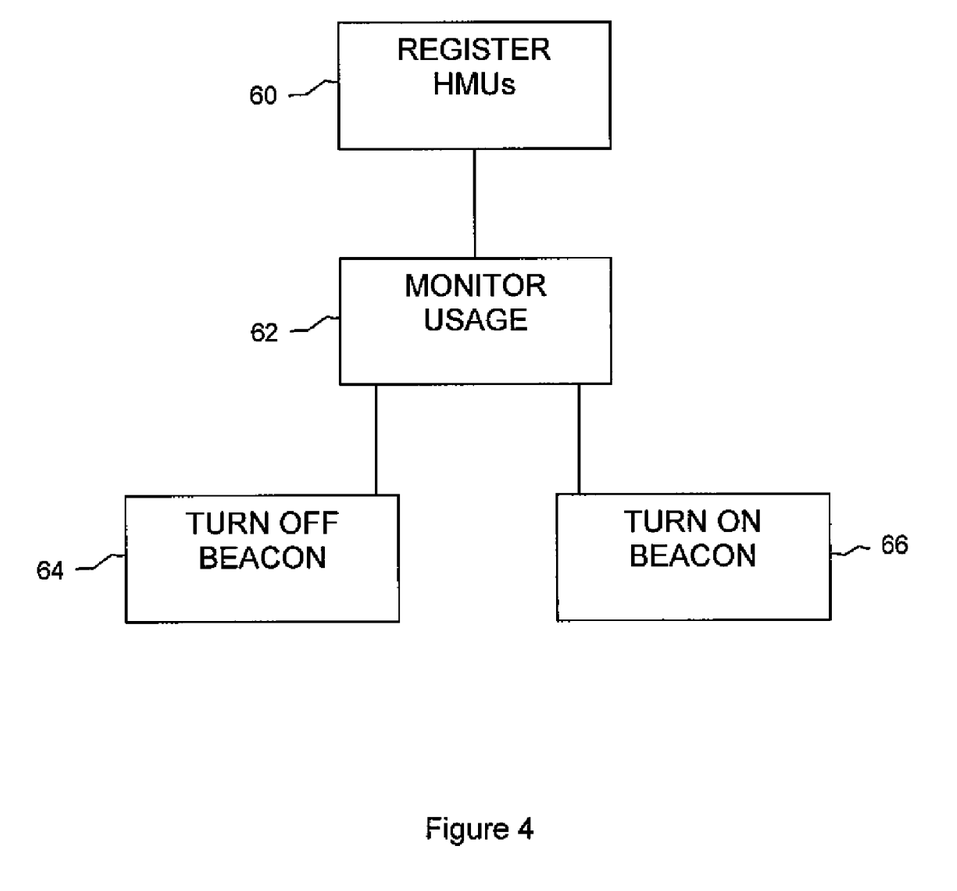
FIG. 4 is a flow diagram of a second method for setting beacon power.

FIG. 4 illustrates another embodiment which may be used in conjunction with the other embodiments described herein. Generally described, this embodiment avoids attracting FMUs by turning off the beacon channel, or reducing its power to zero when it is not needed. The beacon channel is not needed when all registered HMUs are in the structure 20 and are being served by the HBS 22 or when all available ports are being used. At step 60, the authorized HMUs are registered with the HBS 22. In the registration process, the HBS stores an identification number of each authorized HMU.

At step 62, the HBS 22 monitors usage. An HBS 22 may have a small number of available ports, e.g. three. It may have more or less registered HMUs, e.g. four or two. If there are only two registered HMUs and both are being served, then the beacon is not needed and at step 64, the HBS may turn off the beacon. If there are three available ports and all three are being used, then at step 64, the HBS may also turn off the beacon.

Step 62 is a continuous process. If less than all registered HMUs are being served and less than all available ports are being used, then at step 66, the HBS may turn the beacon channel back on. This may occur when a HMU is moved out of the cell 24.

Figure 5:
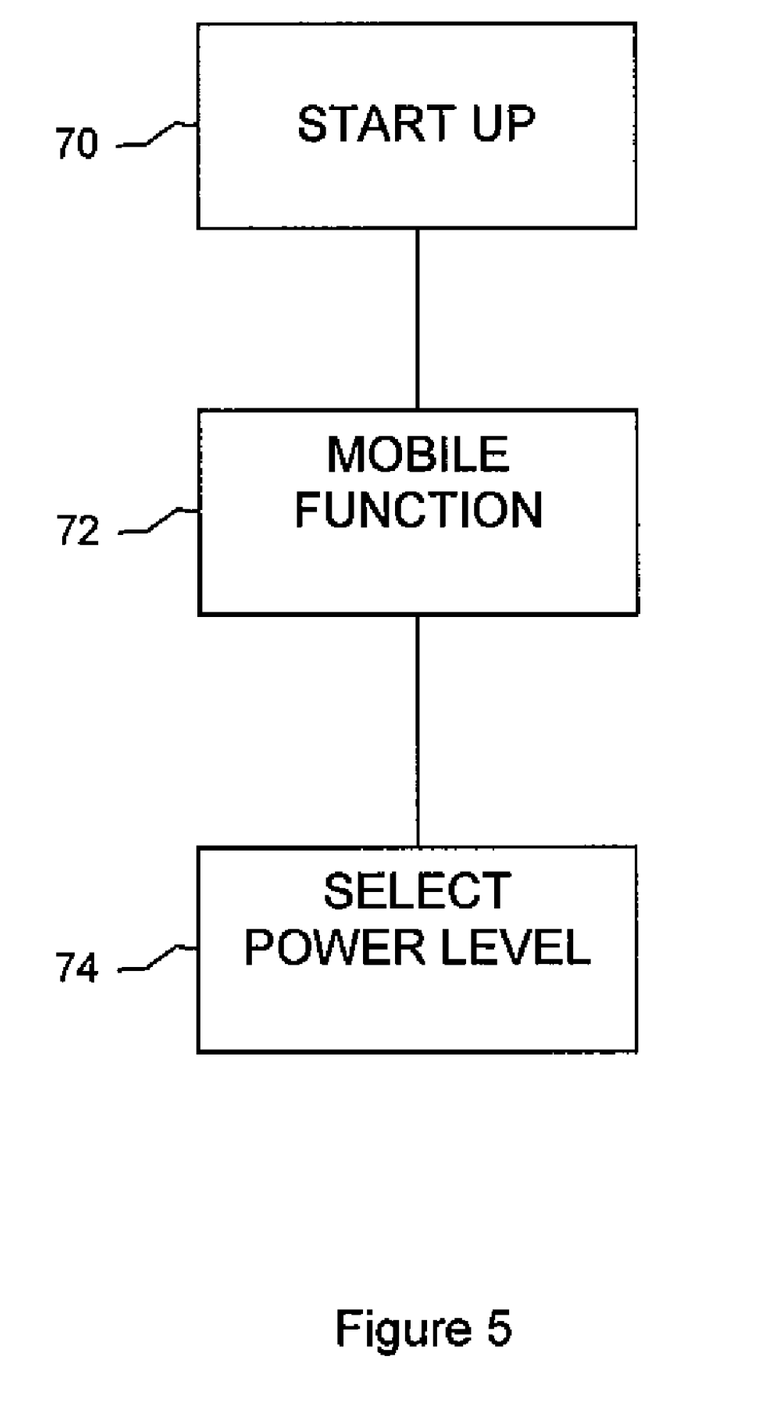
FIG. 5 is a flow diagram of a third method for setting beacon power.

FIG. 5 illustrates another method for setting the beacon power of the HBS 22, as well as for setting the operational carrier power. At step 70, the HBS 22 is started up as described for step 50 of FIG. 3. At step 72, the mobile function 34 of the HBS is activated. This function allows the HBS 22 to receive and measure signals from nearby MBSs which are at the frequencies of the beacon and operational channels used by the HBS 22. At step 74, both the HBS 22 operational carrier power and beacon power may be selected to provide better power than the MBSs at preselected distances from the HBS 22. As described above, in one embodiment the operational carrier may have an effective range of thirty meters and the beacon may have an effective range of about ten meters. A MBS signal power measured by the HBS 22 at the operational carrier frequency of the HBS 22 may be used to estimate operational power of the HBS 22 needed to provide better coverage than the MBS at a distance of about thirty meters from the HBS 22. Likewise, a MBS signal power measured by the HBS 22 at the beacon carrier frequency or frequencies of the HBS 22 may be used to estimate beacon power of the HBS 22 needed to provide better coverage than the MBS at a distance of about ten meters from the HBS 22. As noted above, the particular distances are configurable. In any case, the beacon power of the HBS 22 is selected to be substantially less than the operational carrier power of the HBS 22. The method of FIG. 5 may be combined with the method of FIG. 3, to set the beacon power at a fixed offset from the selected operational carrier power.

Figure 6:
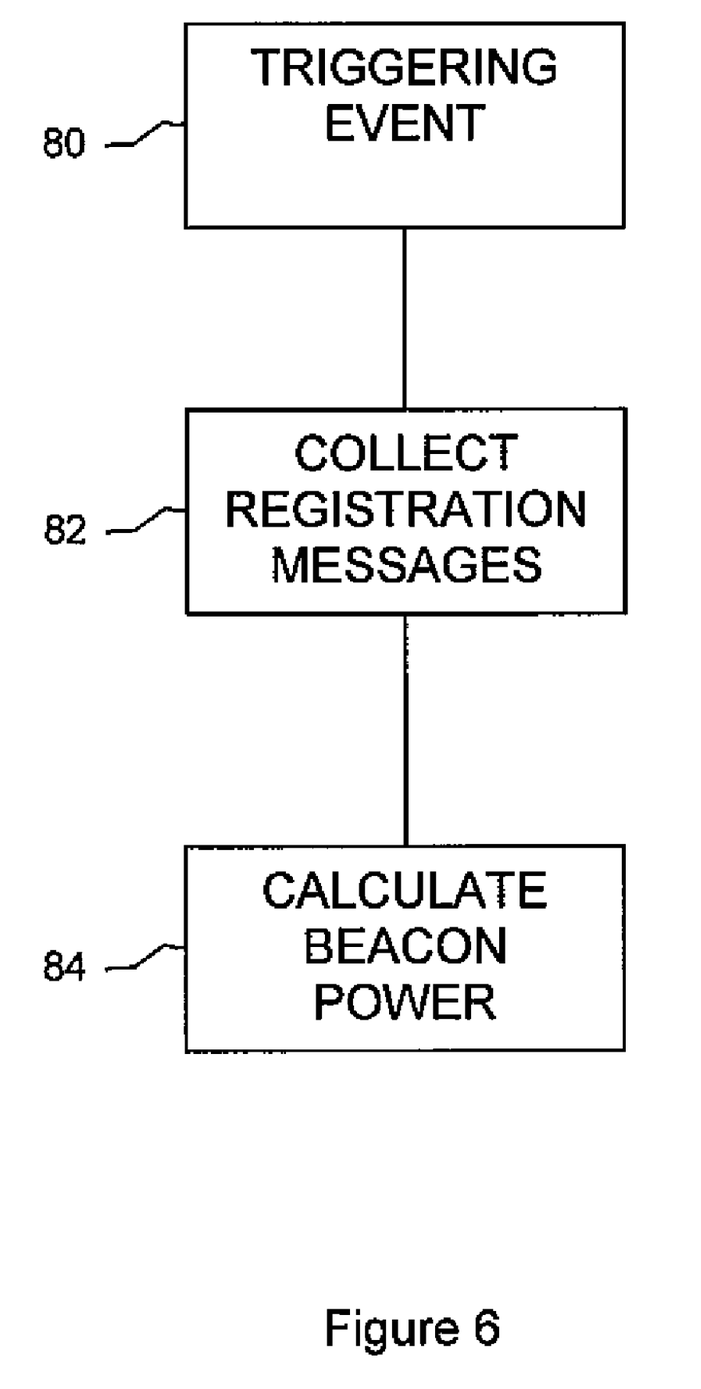
FIG. 6 is a flow diagram of a fourth method for setting beacon power.

FIG. 6 illustrates another method for setting the HBS 22 beacon power level. This method may be the same in most respects as the methods disclosed in the above referenced U.S. patent application Ser. No. 11/431,395 for setting the operational power level. The method begins with a triggering event, step 80, which may be any of the start up events 50 discussed with reference to FIG. 3. At step 82, the HBS collects registration messages from its HMUs and from FMUs. The registration messages include pilot strength measurements of all pilot signals being received by the various MUs, i.e. both from the HBS 22 and from nearby MBSs such as MBSs 12, 14. The HBS 22 may collect registration messages from HMUs by sending registration request messages to the HMUs, which should respond with a registration message. The HBS 22 may collect registration messages from FMUs by temporarily raising its beacon power level to cause nearby FMUs to attempt to handoff to the HBS 22.

At step 84, the HBS 22 uses the received pilot signal power measurements to calculate a desirable beacon power level. The level should be high enough to provide more power to the HMUs which are currently being served by the HBS 22 than the power received by the HMUs from MBSs. The level should be low enough so that it provides less power to the FMUs than the FMUs receive from MBSs. In normal CDMA systems, a MU must measure a pilot signal 3 dB greater than that supplied by its current MBS before it will attempt a handoff to another MBS. When the HBS 22 receives a registration message from a FMU, the pilot signal measurements will tell the HBS how much stronger its received pilot signal was than the pilots received from nearby MBSs. The HBS 22 can easily calculate how much it needs to reduce its beacon power to prevent the FMUs from attempting handoff to the HBS. For instance, if the registration message indicates the HBS 22 beacon strength was 6 dB greater than a nearby MBS pilot signal, the HBS 22 knows that it must reduce its beacon carrier power by more than 3 dB to prevent future handoff requests. The HBS 22 would need to at least temporarily drop its beacon power by at least 9 dB to cause the FMU to return to its MBS. The beacon power may desirably be left at the lower power, especially if other methods discussed above indicate that the power level satisfies the other methods in being substantially less than the operational power and provides effective power only within a short distance, e.g. ten meters, of the HBS 22.

In operation, the HBS 22 is installed in a premises, such as a residence 20. As part of the installation and set up, a number of MUs may be registered with the HBS 22 and thereby effectively become HMUs. The HMUs are conventional MUs and the residents of the home 20 may use them throughout the areas served by MBSs. When HMU 26 is in cell 16 it will probably be served by MBS 12. When HMU 26 moves into cell 18, it will probably handoff to the MBS 14 according to conventional handoff methods. When the HMU 26 arrives home, it will first enter the cell 24. However, the beacon power of HBS 22 is preferably adjusted to be effective only within the actual structure of the home 20. While the HMU 26 will probably detect the beacon from HBS 22 outside the structure 20, the beacon power outside the structure 20 should not be 3 dB greater than the power level received by HMU 26 from MBS 14. When the HMU 26 enters the structure 20, the beacon power from HBS 22 should be at least 3 dB greater than the power received from MBS 14, and should trigger a handoff to the HBS 22. The walls of the structure 20 assist the handoff process since they naturally attenuate the signals and may be a cause of the RF hole problem. If after the handoff occurs, the HMU 26 is moved outside the structure 20, but remains nearby, for example within the cell 24, it will continue to receive acceptable operational carrier service from HBS 22, since its operational carrier is set as high as possible without causing interference to FMUs such as FMU 28. A handoff back to the MBS 14 will not occur until the HMU 26 moves sufficiently far away from structure 20 for the beacon power from MBS 14 to exceed the operational power of HBS 22 by at least 3 dB. As a result, the HMU 26 is provided effective service within structure 20 where an RF hole would otherwise exist and is provided effective service outside the structure 20 by the conventional MBSs 14, 12, etc.

While the disclosed embodiments are directed to a base station in a private residence, it is apparent that the present disclosure is equally applicable to other embodiments. The HBS 22 may be used in other locations such as business premises, schools, libraries, etc. Any enclosed structure may generate an RF hole with poor service from the MBSs and service may be improved by installation of an HBS in the structure.

Figure 7:
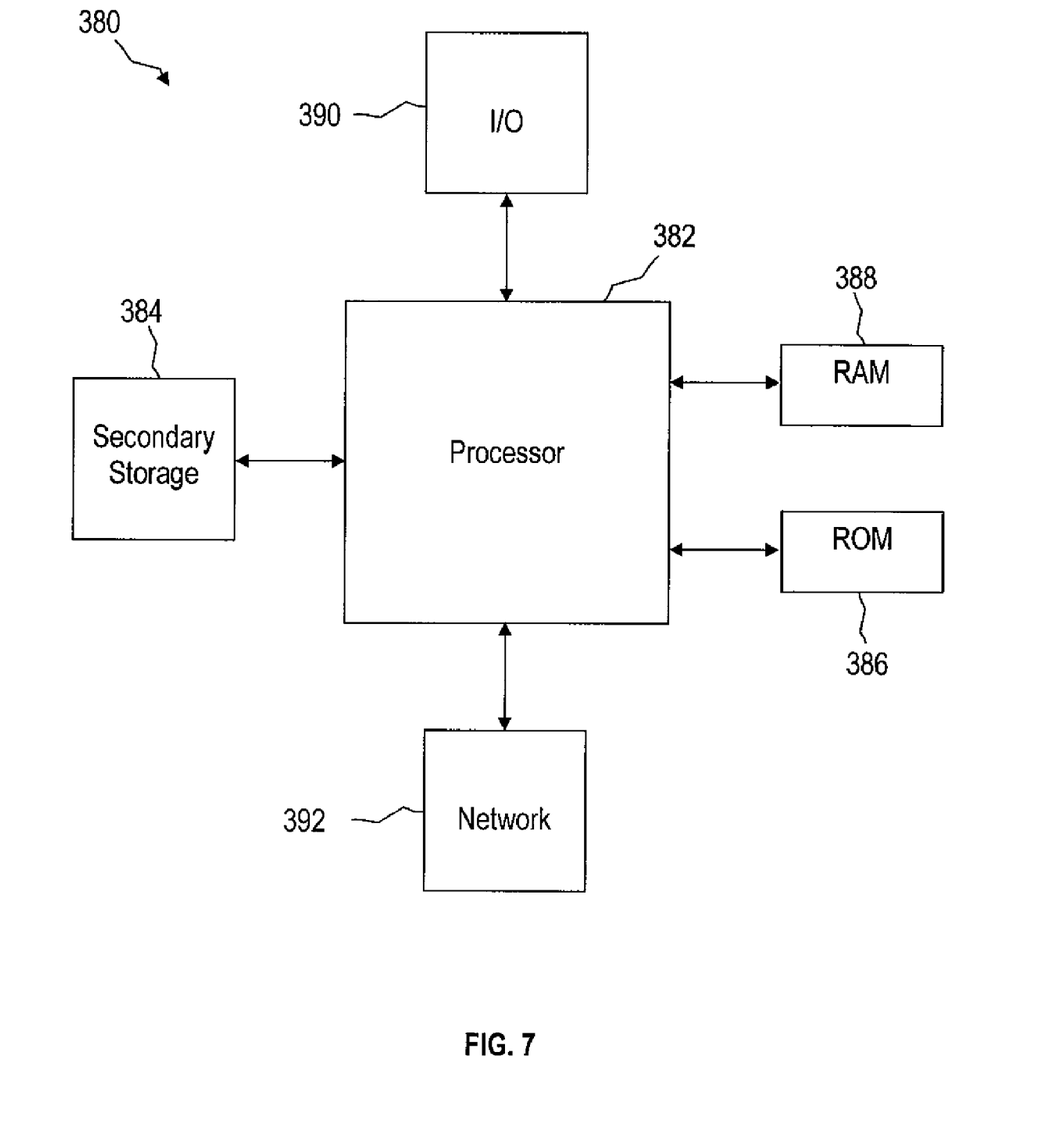
FIG. 7 illustrates an exemplary general purpose computer system suitable for implementing the several embodiments of the disclosure.

The system described above may be implemented on any general-purpose computer with sufficient processing power, memory resources, and network throughput capability to handle the necessary workload placed upon it. FIG. 7 illustrates a typical, general-purpose computer system suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) 390 devices, and network connectivity devices 392. The processor may be implemented as one or more CPU chips.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage. The RAM 388 is used to store volatile data and perhaps to store instructions. Access to both ROM 386 and RAM 388 is typically faster than to secondary storage 384.

I/O 390 devices may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, ethernet cards, universal serial bus (USB) interface cards, serial interfaces, token ring cards, fiber distributed data interface (FDDI) cards, wireless local area network (WLAN) cards, and other well-known network devices. These network connectivity 392 devices may enable the processor 382 to communicate with an Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave Such information, which may include data or instructions to be executed using processor 382 for example, may be received from and outputted to the network, for example, in the form of a computer data baseband signal or signal embodied in a carrier wave. The baseband signal or signal embodied in the carrier wave generated by the network connectivity 392 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A base station for use within a structure, comprising:
   an apparatus configured to set an operating carrier power level to provide service within the structure and in a limited area surrounding the structure to promote reducing interfering with mobile units outside the limited area; and
   an apparatus configured to set a beacon channel power to provide service substantially within the structure,
   wherein the operating carrier power is set to provide service at a preselected first distance from the base station and the beacon channel power level is set to provide service at a second distance from the base station, the second distance being less than the first distance.

2. The base station of claim 1, wherein the beacon channel power is substantially less than the operating carrier power.

3. The base station of claim 1, wherein the beacon channel power is at least 6 dB less than the operating carrier power.

4. The base station of claim 1, wherein the structure is a private premises.

5. The base station of claim 1, wherein the beacon channel power is set at a preselected level less than the operating carrier power level.

6. The base station of claim 1, wherein the base station further comprises a Global Positioning System (GPS) receiver.

7. The base station of claim 1, wherein base station is connected to a telephone service provider through a network.

8. The base station of claim 1, wherein the first distance is about thirty meters and the second distance is about ten meters.

9. The base station of claim 1, wherein:
   the base station further comprises a mobile unit receiver, the mobile unit receiver configured to measure power levels of signals from macro base stations near the base station, and
   the base station is configured to calculate an effective power level of the beacon channel.

10. The base station of claim 1, wherein the base station is configured to serve less than five mobile units at any one time.

11. The base station of claim 1, wherein the base station is configured to serve only mobile units which have been registered with the base station.

12. A code division multiple access telecommunications network, comprising:
    a plurality of macro base stations connected to a first network and controlled by one or more macro base station controllers; and
    a home base station located within a structure in a cell served by at least one of the macro base stations, the home base station not being connected to the first network and not associated with any of the one or more macro base stations, the home base station configured to:
    set an operating carrier power level to provide service within the structure and in a limited area surrounding the structure to reduce interfering with mobile units outside the limited area,
    set a beacon channel power to provide service substantially within the structure; and
    receive and measure the strength of operating carrier channels and pilot signals from at least some of the macro base stations and to set the home base station operating channel power and pilot channel power based at least in part on the measurements.

13. The code division multiple access telecommunications network of claim 12, wherein the home base station further comprises a mobile unit receiver.

14. The code division multiple access telecommunications network of claim 12, wherein the structure is a private premises.

15. A method for a home base station in a code division multiple access telecommunications network, comprising:
    receiving and measuring a strength of pilot signals from a macro base station;
    setting an operating carrier power level to provide service within the structure and in a limited area surrounding the structure to reduce interference with mobile units outside the limited area, and
    setting a beacon channel power to provide service substantially within the structure, the beacon channel power setting based at least in part on the measurements of the strength of the pilot signals.

16. The method of claim 15, wherein the home base station comprises a mobile unit receiver apparatus.

17. The method of claim 15, further comprising setting the beacon power level at a fixed level below the power level of the operating channel.

18. The method of claim 15, further comprising setting the beacon power level at least 6 dB below the power level of the operating channel.

19. The method of claim 15, wherein the macro base station connects to a telephone service provider through a first network and is controlled by a first base station controller, and the home base station connects to the telephone service provider through a second network and is not controlled by the first base station controller.

20. The method of claim 19, wherein the home base station communicates with the telephone service provider via a high speed connection selected from a group consisting of cable, DSL (digital subscriber line), and an optical fiber connection.

* * * * *